United States Patent
Nishikawa et al.

(10) Patent No.: US 12,371,236 B2
(45) Date of Patent: Jul. 29, 2025

(54) GAS BARRIER LAMINATE AND PACKAGING MATERIAL

(71) Applicant: TOPPAN INC., Tokyo (JP)

(72) Inventors: Takeshi Nishikawa, Tokyo (JP); Kaoru Furuta, Tokyo (JP); Miki Fukugami, Tokyo (JP); Ayumi Tanaka, Tokyo (JP); Mikinori Yamada, Tokyo (JP)

(73) Assignee: TOPPAN INC., Tokyo (JP)

( * ) Notice: Subject to any disclaimer, the term of this patent is extended or adjusted under 35 U.S.C. 154(b) by 188 days.

(21) Appl. No.: 18/135,953

(22) Filed: Apr. 18, 2023

(65) Prior Publication Data

US 2023/0257172 A1    Aug. 17, 2023

Related U.S. Application Data

(63) Continuation of application No. PCT/JP2021/038248, filed on Oct. 15, 2021.

(30) Foreign Application Priority Data

Oct. 23, 2020  (JP) .................................. 2020-178146

(51) Int. Cl.
*B65D 65/40* (2006.01)
*B32B 7/12* (2006.01)
(Continued)

(52) U.S. Cl.
CPC .............. *B65D 65/40* (2013.01); *B32B 27/32* (2013.01); *B65D 65/42* (2013.01); *B65D 81/24* (2013.01); *B32B 7/12* (2013.01); *B32B 27/08* (2013.01); *B32B 27/306* (2013.01); *B32B 2255/10* (2013.01); *B32B 2255/20* (2013.01); *B32B 2255/205* (2013.01); *B32B 2255/26* (2013.01); *B32B 2255/28* (2013.01); *B32B 2307/514* (2013.01); *B32B 2307/536* (2013.01);
(Continued)

(58) Field of Classification Search
None
See application file for complete search history.

(56) References Cited

U.S. PATENT DOCUMENTS 12,071,288 B2 *  8/2024  Nishikawa ........... C09D 167/02
2018/0009206 A1  1/2018  Murase et al.
(Continued)

FOREIGN PATENT DOCUMENTS

EP  3 275 651 A1  1/2018
EP  4 039 463 A1  8/2022
(Continued)

OTHER PUBLICATIONS

International Searching Authority, "International Search Report," issued in connection with International Patent Application No. PCT/JP2021/038248, dated Dec. 28, 2021.
(Continued)

*Primary Examiner* — Ramsey Zacharia
(74) *Attorney, Agent, or Firm* — Foley & Lardner LLP

(57) ABSTRACT

A gas barrier laminate including: a substrate layer which contains a polyolefin resin; a barrier layer; and an overcoat layer which contains a polyvinyl alcohol resin, the overcoat layer having a surface which has a surface hardness of 1.5 GPa or less, as measured by a nanoindentation method.

8 Claims, 3 Drawing Sheets

(51) Int. Cl.
*B32B 27/08* (2006.01)
*B32B 27/30* (2006.01)
*B32B 27/32* (2006.01)
*B65D 65/42* (2006.01)
*B65D 81/24* (2006.01)

(52) U.S. Cl.
CPC ..... *B32B 2307/54* (2013.01); *B32B 2307/748* (2013.01); *B32B 2553/00* (2013.01); *B65D 2565/387* (2013.01)

(56) References Cited

U.S. PATENT DOCUMENTS

| | | |
|---|---|---|
| 2022/0396870 A1 | 12/2022 | Suzuki et al. |
| 2023/0220536 A1 | 7/2023 | Tanaka et al. |

FOREIGN PATENT DOCUMENTS

| | | |
|---|---|---|
| EP | 4 205 974 A1 | 7/2023 |
| JP | 2005-008787 A | 1/2005 |
| JP | 2005-014298 A | 1/2005 |
| JP | 2005-096353 A | 4/2005 |
| JP | 2008-073993 A | 4/2008 |
| JP | 2009-006582 A | 1/2009 |
| JP | 2011-201280 A | 10/2011 |
| JP | 2019-130736 A | 8/2019 |
| JP | 2020-029095 A | 2/2020 |
| WO | WO-2020/129291 A1 | 6/2020 |

OTHER PUBLICATIONS

International Searching Authority, "Written Opinion," issued in connection with International Patent Application No. PCT/JP2021/038248, dated Dec. 28, 2021.

European Extended Search Report issued in corresponding European Patent Application No. 21882727.7 dated Mar. 18, 2024 (7 pages).

Third Party Submission issued in corresponding European Patent Application No. 21882727.7 dated Mar. 4, 2025.

* cited by examiner

GAS BARRIER LAMINATE AND PACKAGING MATERIAL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2021/038248, filed on Oct. 15, 2021, which in turn claims the benefit of JP 2020-178146, filed Oct. 23, 2020, the disclosures of all which are incorporated herein by reference in its entirety.

TECHNICAL FIELD

The present disclosure generally relates to a gas barrier laminate and a packaging material.

BACKGROUND ART

As a packaging material used for packaging food, a barrier film is known which includes a barrier coat layer, an inorganic oxide deposition layer, and a substrate layer, which are arranged in this order (For example, PTL 1).

[Citation List] [Patent Literature] PTL 1: JP 2020-29095 A.

SUMMARY OF THE INVENTION

Technical Problem

Conventional barrier films (gas barrier laminates), such as those described in PTL 1, generally use heat-resistant substrates such as polyester film or nylon film, which were further attached to polypropylene, polyethylene or the like to make bags. However, the recent trend toward mono-materials has increased the need for barrier films to be made of polypropylene or polyethylene substrates.

However, if a polyolefin resin such as polypropylene or polyethylene is used as a substrate in the same manner as polyester film or nylon film to produce a barrier film, processing problems such as bending or blocking may occur during film winding.

The present disclosure has been made in view of the above circumstances, and the purpose of the present disclosure is to provide a gas barrier laminate capable of achieving good processability using a polyolefin substrate. The present disclosure is also intended to provide a packaging material including the gas barrier laminate.

Solution to Problem

As a result of intensive studies, the inventors have found that adjusting the surface hardness of the surface of the overcoat layer (barrier coat layer) to a predetermined value or less is an important factor in improving processability, and thus they completed the gas barrier laminate according to the present disclosure.

The present disclosure provides a gas barrier laminate including: a substrate layer which contains a polyolefin resin; a barrier layer; and an overcoat layer which contains a polyvinyl alcohol resin, the overcoat layer having a surface which has a surface hardness of 1.5 GPa or less, as measured by a nanoindentation method.

In one embodiment, the barrier layer may contain metal, metal oxide, metal nitride, or metal oxynitride.

In one embodiment, the overcoat layer may contain Si.

In one embodiment, the overcoat layer may contain an inorganic layered compound.

The present disclosure provides a packaging material comprising the gas barrier laminate and a sealant layer.

Advantageous Effects of the Invention

According to the present disclosure, it is possible to provide a gas barrier laminate that can achieve good processability using a polyolefin substrate. According to the present disclosure, a packaging material including the gas barrier laminate can be provided.

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

<Gas Barrier Laminate>

Figure 1:
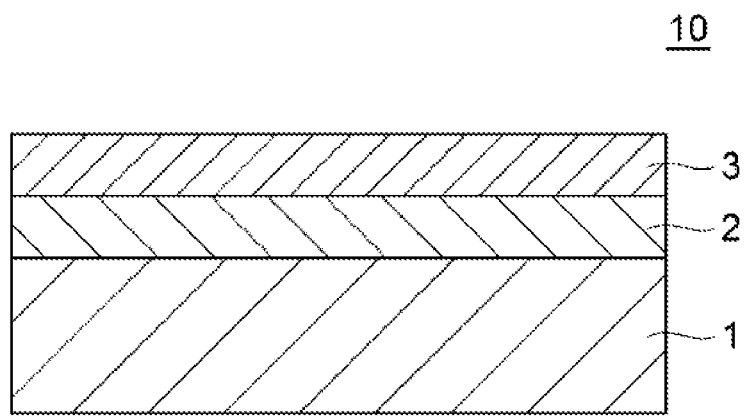
FIG. 1 is a schematic cross-sectional view illustrating a gas barrier laminate according to an embodiment.

FIG. 1 is a schematic cross-sectional view illustrating a gas barrier laminate (barrier film) according to an embodiment. The gas barrier laminate 10 shown in FIG. 1 includes a substrate layer 1, a barrier layer 2, and an overcoat layer 3, which are arranged in this order.

(Substrate Layer)

The substrate layer is a film that serves as one of the supports and contains a polyolefin resin.

Examples of the polyolefin resin include polyethylene (PE), polypropylene (PP), polybutene (PB), and cycloolefin polymers. Examples of the polyolefin resin include acid-modified polyolefins obtained by graft modification of a polyolefin using an unsaturated carboxylic acid, an acid anhydride of an unsaturated carboxylic acid, an ester of an unsaturated carboxylic acid, and the like. Small amounts of second-order and third-order components such as ethylene and butene may be used as raw material monomers in polypropylene synthesis. From the viewpoint of excellent heat resistance, propylene monopolymer film can be used as the substrate layer.

The film constituting the substrate layer may be a stretched film or a non-stretched film. However, in view of impact resistance, thermal stability, water resistance, dimensional stability, and the like, the film constituting the substrate layer may be a stretched film. The stretching method is not specifically limited, and the film may be stretched by any method, such as inflation, or uniaxial stretching, biaxial stretching, as long as a dimensionally stable film can be supplied.

The thickness of the substrate layer is not specifically limited. From the viewpoint of obtaining high impact resistance and high gas barrier properties, the thickness can be 9 to 100 μm, and may be 15 to 30 μm.

The film constituting the substrate layer may have a surface to be laminated that has undergone various pretreatments, such as corona treatment, plasma treatment, and flame treatment, to an extent not impairing barrier properties, or may be provided with a coating layer, such as an adhesion-enhancing layer.

The film which forms the substrate layer may contain additives such as antistatic agents, UV absorbers, plasticizers, and lubricants as needed.

(Barrier Layer)

A barrier layer imparts gas barrier properties to the substrate layer. The use of the barrier layer provides high gas barrier properties while reducing thickness. Since the barrier layer can be formed on the substrate by vacuum deposition, it can also be called a vacuum deposition layer.

The barrier layer may contain metal, metal oxide, metal nitride, or metal oxynitride. Specifically, the barrier layer is composed of metals such as metallic aluminum (Al), metal oxides such as silicon oxide (SiOx) and aluminum oxide (AlOx), metal nitrides such as silicon nitride (SiN), and metal oxynitrides such as silicon oxynitride (SiON). From the point of view of transparency and barrier properties, the constituent material of the barrier layer can be aluminum oxide and silicon oxide. From the point of view of excellent tensile stretchability during processing, the constituent material of the barrier layer can be silicon oxide. When a silicon oxide film is used as the barrier layer, the O/Si ratio can be 1.2 to 1.9 from the viewpoint of gas barrier properties.

The barrier layer may have a thickness of 5 nm to 80 nm. When the layer thickness is 5 nm or more, it is easier to obtain sufficient gas barrier properties. When the layer thickness is 80 nm or less, cracking due to deformation caused by internal stress in the thin film is suppressed, and it becomes easier to suppress degradation of gas barrier properties. When the layer thickness exceeds 80 nm, the cost tends to increase due to the increase in the amount of material used and the increase in the time for forming films, which is not preferable from an economic aspect. In view of the above, the thickness of the barrier layer may be 10 nm to 50 nm, or 20 nm to 40 nm.

(Overcoat Layer)

As the polyvinyl alcohol resin, any resin having a vinyl alcohol unit in which a vinyl ester unit is saponified may be used, and examples include polyvinyl alcohol (PVA) and ethylene-vinyl alcohol copolymer (EVOH). PVA may be used suitably from the viewpoint of versatility and solubility.

Examples of PVA include resins obtained by polymerizing a vinyl ester alone, such as vinyl acetate, vinyl formate, vinyl propionate, vinyl valerate, vinyl caprate, vinyl laurate, vinyl stearate, vinyl pivalate, or vinyl versatate, and then saponifying the polymerized product.

The PVA may also be a modified PVA obtained by copolymerization modification or post-modification. The copolymerized modified PVA may be obtained by, for example, copolymerizing a vinyl ester and an unsaturated monomer copolymerizable with the vinyl ester, and then saponifying the polymerized product. The post-modified PVA may be obtained by copolymerizing a PVA which has been obtained by saponifying a vinyl ester with an unsaturated monomer in the presence of a polymerization catalyst. The degree of modification of the modified PVA can be less than 50 mol % from the viewpoint of obtaining sufficient gas barrier properties, and may be 10 mol % or more from the viewpoint of obtaining the effect of modification.

Examples of the above unsaturated monomer include: olefins such as ethylene, propylene, isobutylene, α-octene, α-dodecene, and α-octadecene; hydroxy group-containing α-olefins such as 3-buten-1-ol, 4-pentyn-1-ol, and 5-hexen-1-ol; unsaturated acids such as acrylic acid, methacrylic acid, crotonic acid, maleic acid, maleic anhydride, itaconic acid, and undecylenic acid; nitriles such as acrylonitrile and methacrylonitrile; amides such as diacetone acrylamide, acrylamide, and methacrylamide; olefin sulfonic acids such as ethylene sulfonic acid, allyl sulfonic acid, and methallyl sulfonic acid; vinyl compounds such as alkyl vinyl ether, dimethyl allyl vinyl ketone, N-vinylpyrrolidone, vinyl chloride, vinyl ethylene carbonate, 2,2-dialkyl-4-vinyl-1,3-dioxolane, glycerin monoallyl ether, and 3,4-diacetoxy-1-butene; vinylidene chloride, 1,4-diacetoxy-2-butene, vinylene carbonate, polyoxypropylene, and polyoxypropylene vinyl amine. From the viewpoint of gas barrier properties, the unsaturated monomer may be an olefin, and may be particularly ethylene.

Examples of the polymerization catalyst include radical polymerization catalysts such as azobisisobutyronitrile, benzoyl peroxide, and lauryl peroxide. The polymerization method is not specifically limited, and bulk polymerization, emulsion polymerization, solvent polymerization, and the like can be used.

The degree of polymerization of PVA is preferably 300 to 3000. When the degree of polymerization is 300 or more, the barrier property is less likely to deteriorate, and when the degree of polymerization is 3000 or less, it is easy to control lowering of the coating suitability due to excessively high viscosity. The degree of saponification of PVA is preferably 80 mol % or more, more preferably 90 mol % or more, and still more preferably 98 mol % or more. Further, the degree of saponification of PVA may be 100 mol % or less, or may also be 99.9 mol % or less. The degree of polymerization and degree of saponification of PVA can be determined according to the method described in JIS K 6726 (1994).

EVOH is generally obtained by saponifying a copolymer of ethylene and an acid vinyl ester such as vinyl acetate, vinyl formate, vinyl propionate, vinyl valerate, vinyl caprate, vinyl laurate, vinyl stearate, vinyl pivalate, and vinyl versatate.

The ethylene unit content of EVOH may be 10 mol % or more, preferably 15 mol % or more, more preferably 20 mol % or more, and particularly preferably greater than 35 mol %. Further, the ethylene unit content of EVOH is preferably 65 mol % or less, more preferably 55 mol % or less, and still more preferably less than 50 mol %. The ethylene unit content of 10 mol % or more allows good gas barrier properties or dimensional stability to be maintained under high humidity. On the other hand, the ethylene unit content of 65 mol % or less may improve the gas barrier properties. The ethylene unit content of EVOH may be calculated using an NMR method.

Saponification can be carried out with an alkali or acid. From the viewpoint of saponification rate, an alkali can be used. Examples of the alkali include alkali metal hydroxides such as sodium hydroxide and potassium hydroxide, and alkali metal alkoxides such as sodium ethylate, potassium ethylate and lithium methylate.

An overcoat layer may contain Si (Si element). Specifically, the overcoat layer may be a cured product of a raw material for forming an overcoat layer containing a polyvinyl alcohol resin and a silane compound (organic silicon compound). Examples of the silane compounds include alkoxysilanes (tetraalkoxysilanes) such as tetramethoxysilane and tetraethoxysilane, and silazanes such as hexamethyldisilazane. As the silane compound, a compound commonly used as a silane coupling agent or a polysiloxane compound having a siloxane bond may be used. By using a silane coupling agent, the strength in the overcoat layer is further improved, and barrier properties and water resistance are likely to be improved. Examples of the silane coupling agent include epoxysilane (glycidoxypropyltrimethoxysilane, glycidoxypropyltriethoxysilane, etc.), (meth) acrylsilane (acryloxypropyltrimethoxysilane, etc.), aminosilane, ureidosilane, isocyanate silane, isocyanurate silane (tris (3-trialkoxysilylpropyl) isocyanurate, etc.), and mercaptosilane. These may be used singly or in combination of two or more.

When forming the overcoat layer, the amount of silane compound in the above-described raw material may be 0.1 to 5.0 parts by mass, may be 0.3 to 5.0 parts by mass, may be 0.4 to 4.5 parts by mass, or 0.5 to 4.0 parts by mass relative to 1 part by mass of the polyvinyl alcohol resin, from the viewpoint of adhesion with the barrier layer and maintenance of gas barrier properties.

The overcoat layer may contain a polyurethane resin in terms of bending resistance and gas barrier properties. Specifically, the overcoat layer may be a cured product of a raw material for forming an overcoat layer containing a polyvinyl alcohol resin, a polyurethane resin, and a silane compound. The polyurethane resin is preferably an aqueous polyurethane resin.

The aqueous polyurethane resin contains an acid group-containing polyurethane resin, and a polyamine compound. The use of an aqueous polyurethane resin makes it possible to easily provide flexibility, gas barrier properties, and especially oxygen barrier properties to the overcoat layer. The aqueous polyurethane resin may be commercially available or produced by a known production method. Commercially available products include Takelac WPB-341 (manufactured by Mitsui Chemicals, Inc.) and Hydran HW350 (manufactured by DIC Corporation).

When forming the overcoat layer, the amount of the polyurethane resin in the raw material for forming an overcoat layer may be 0.9 to 4.0 parts by mass relative to 1 part by mass of the polyvinyl alcohol resin, and may be 1.1 to 3.0 parts by mass or 1.2 to 2.5 parts by mass from the viewpoint of bending resistance and gas barrier properties.

The overcoat layer may contain an inorganic layered compound. Specifically, the overcoat layer may be a cured product of a raw material for forming an overcoat layer containing a polyvinyl alcohol resin and an inorganic layered compound. Examples of inorganic layered compounds include montmorillonite, smectite, and mica. The inorganic layered compound may be metal oxide such as silica synthesized on a flat plate.

When forming the overcoat layer, the amount of inorganic layered compound in the above-described raw material (specifically, the amount of inorganic layered compound in the overcoat layer) may be 0.01 to 0.6 parts by mass, or 0.1 to 0.5 parts by mass relative to 1 part by mass of the polyvinyl alcohol resin, from the viewpoint of adhesion with the barrier layer and maintenance of gas barrier properties.

Although the thickness of the overcoat layer is not particularly limited, it may be 0.05 to 2 µm, may be 0.1 to 0.6 µm, or may be 0.2 to 0.5 µm, from the viewpoint of barrier properties and processability.

The surface hardness of the surface of the overcoat layer (the surface opposite the barrier layer side of the overcoat layer) is 1.5 GPa or less, as measured by the nanoindentation method (measurement using a nanoindenter). As a result, even when a polyolefin substrate is used, it is possible to suppress the occurrence of bending or blocking during film winding and to realize good processability. The inventors presume that the reason for this is that when using a polyolefin substrate that is softer than a polyester substrate, the damage to the barrier layer or the overcoat layer can be suppressed by using an overcoat layer that is not too hard, thereby maintaining good processability. From this perspective, the hardness may be 1.3 GPa or less, may be 1.1 GPa or less, and may be 0.9 GPa or less. The lower limit of hardness is not limited, but can be 0.1 GPa in terms of the degree of crosslinking to maintain barrier properties. The surface hardness of the surface of the overcoat layer can be adjusted by the amount of silane compound or layered compound added, the processing temperature at the time of overcoat layer formation, and the like.

The composite elastic modulus of the surface of the overcoat layer can be 10 GPa or less when measured by the nanoindentation method. As a result, even when a polyolefin substrate is used, it is possible to suppress the occurrence of bending or blocking during film winding and to realize good processability. The inventors presume that, as described above, an overcoat layer that is not too hard can be used to maintain good processability. From this perspective, the composite elastic modulus may be 9 GPa or less, may be 7.5 GPa or less, and may be 6 GPa or less. The lower limit of the composite elastic modulus is not limited, but can be 0.1 GPa in terms of the degree of crosslinking to maintain barrier properties. The composite elastic modulus of the surface of the overcoat layer can be adjusted by the amount of silane compound or layered compound added, the processing temperature at the time of overcoat layer formation, and the like.

The measurement method of each property by the nanoindentation method is described below. The nanoindentation method is a method of performing quasi-static indentation tests on a sample to obtain the mechanical properties of the sample.

First, a sample is fixed to a sample fixing jig such as a magnetic disk or slide glass using adhesive, and then fixed to the stage of a measuring device. A Hysitron TI-Premier (trade name) manufactured by Bruker Japan K.K. can be used as the measuring device, and a Berkovich-type diamond indenter manufactured by Bruker Japan K.K. can be used as the measuring indenter.

Measurement by the nanoindentation method is performed at room temperature (25° C.) by indenting to a depth of 30 nm under the conditions of displacement control mode and indentation speed of 30 nm/sec, holding at the maximum depth for 1 second, and unloading under the conditions of unloading speed of 30 nm/sec. To calculate the hardness and composite elastic modulus of the measurement sample, fused quartz, which serves as a standard sample, is tested in advance to calibrate the relationship between the contact depth and the contact projected area of the indenter and the sample. Next, the unloading curve in the 60 to 95% region relative to the maximum load during unloading is analyzed by the Oliver-Pharr method to calculate the hardness and composite elastic modulus of the measurement sample.

When a sealant layer is attached to the surface of the gas barrier laminate on the overcoat layer side (the packaging material in FIG. 2), measurement by the nanoindentation method may be performed after the overcoat layer is exposed, for example, by the following procedure.

Firstly, the packaging material is cut into a size of 2 cm in length and width, and the whole cut packaging material is immersed in ethyl acetate solvent. One hour after the start of immersion, the packaging material was taken out and the sealant layer was removed from the edge of the packaging material.

Since the adhesive between the overcoat layer and the sealant layer remains in the gas barrier laminate after the sealant layer is removed, ion etching treatment is applied to the removed surface of the gas barrier laminate to remove this adhesive as follows. First, in order to improve the effect of the ion etching process by altering the adhesive, the entire gas barrier laminate from which the sealant layer was removed is immersed in ethyl acetate solvent. After 30 minutes from the start of immersion, the gas barrier laminate is taken out, and the removed surface of the gas barrier laminate is subjected to ion etching treatment for three times for 10 minutes under HARD treatment conditions using the Plasma Ion Bombarder PIB-10 (manufactured by Vacuum Device Inc.). In order to prevent contamination of the removed surface due to the ion etching treatment, it is preferable to clean the electrode of the Plasma Ion Bombarder with Pikal Liquid (manufactured by NIHON MARYO KOGYO CO., LTD.) before the ion etching treatment.

By the above procedure, the overcoat layer may be exposed on the entire removed surface or may be exposed only on a portion of the removed surface. The confirmation of whether the overcoat layer is exposed can be performed by confirming the surface roughness by atomic force microscopy (AFM), for example. Specifically, the surface profiles of the overcoat layer without a sealant layer and the overcoat layer removed as described above after the sealant layer is disposed are measured by AFM, and then the surface roughnesses are compared to see if the overcoat layer is exposed. For example, if the shape is measured by AFM with a field of view of 5 μm and the respective arithmetic mean roughness (Ra) is similar (for example, 0.51 nm for the former and 0.54 nm for the latter), it can be determined that the overcoat layer is sufficiently exposed.

(Anchor Coat Layer)

The gas barrier laminate may include an anchor coat layer (adhesive layer) on the substrate layer to improve adhesion with the barrier layer. Examples of the material of the anchor coat layer include polyester resin, polyamide resin, polyurethane resin (resin made by reacting isocyanates with polyols such as polyester urethane and acrylic urethane), epoxy resin, phenolic resin, (meth) acrylic resin, polyvinyl acetate resin, ethylene-vinyl alcohol copolymer, polyolefin resin such as polyethylene and polypropylene, and cellulose resin. The anchor coat layer may contain Si derived from a silane coupling agent. Specifically, the anchor coat layer may be a cured product of the above resin and a raw material containing a silane coupling agent.

The anchor coat layer may have a thickness in the range of 0.01 to 2 μm, and may be 0.05 to 0.5 μm, in terms of layer uniformity and flexibility.

<Method of Producing Gas Barrier Laminate>

The gas barrier laminate can be produced by a production method that includes, for example, a step of forming a barrier layer on a substrate layer and a step of forming an overcoat layer on the barrier layer.

(Step of Forming Barrier Layer)

The barrier layer can be formed by, for example, a vacuum deposition method. The vacuum deposition method can be performed as physical vapor deposition or chemical vapor deposition. Examples of the physical vapor deposition method include a vacuum vapor deposition method, a sputtering method, and an ion plating method. Examples of the chemical vapor deposition method include a thermal CVD method, a plasma CVD method, an optical CVD method, and the like. However, the step of forming a barrier layer is not limited to these.

(Steps of Forming Overcoat Layer)

In this step, a coating solution (raw material for forming an overcoat layer) containing a polyvinyl alcohol resin and a liquid medium can be used. The coating solution can be obtained by, for example, dissolving a synthetic polyvinyl alcohol resin powder in a liquid medium. Examples of the liquid medium include water, dimethylsulfoxide, dimethylformamide, dimethylacetamide, N-methylpyrrolidone, various glycols, alcohols such as isopropyl alcohol, polyvalent alcohols such as trimethylolpropane, and amines such as ethylenediamine and diethylenetriamine. These may be used singly or in combination of two or more. From the viewpoint of reducing environmental burden and the like, water can be used as a liquid medium. In this case, a coating solution can be obtained by dissolving a polyvinyl alcohol resin powder in water having a high temperature (for example, 80° C.).

The solid content of the polyvinyl alcohol resin in the coating solution can be 3 to 20 mass % from the viewpoint of maintaining good coating properties.

The coating solution may contain the above-described silane compound, polyurethane resin, and an inorganic layered compound. The content of these components in the coating solution may be adjusted so that the amount of each component relative to the amount of the polyvinyl alcohol resin is the desired amount.

The coating solution may contain an additive such as an isocyanate or polyethyleneimine for improving adhesion. The coating solution may further contain additives such as a preservative, a plasticizer, alcohol, and a surfactant.

The coating solution can be applied to the barrier layer by any suitable method. For example, the coating solution can be applied by a wet film formation method using a gravure coater, a dip coater, a reverse coater, a wire bar coater, a die coater, or the like. The coating temperature and the drying temperature of the coating solution are not specifically limited, and may be, for example, 50° C. or higher.

The overcoat layer may be formed on the barrier layer by an extrusion method. In the case of applying an extrusion method, a multilayer extrusion using a T-die can be used. Examples of the adhesive that can be used during extrusion include maleic anhydride modified polypropylene resin.

The above adhesive may be applied to the barrier layer and dried to form an adhesive layer on the barrier layer in advance.

The adhesive layer may have a thickness in the range of 0.1 to 50 μm, or 0.5 to 20 μm, in terms of adhesion, followability, and processability.

(Steps of Forming Anchor Coat Layer)

In the case of forming an anchor coat layer, this step may be performed prior to the step of forming a barrier layer. The anchor coat layer may be formed on the substrate layer by coating or an extrusion method using the material of the anchor coat layer in the same manner as the overcoat layer.

<Packaging Material>

Figure 2:
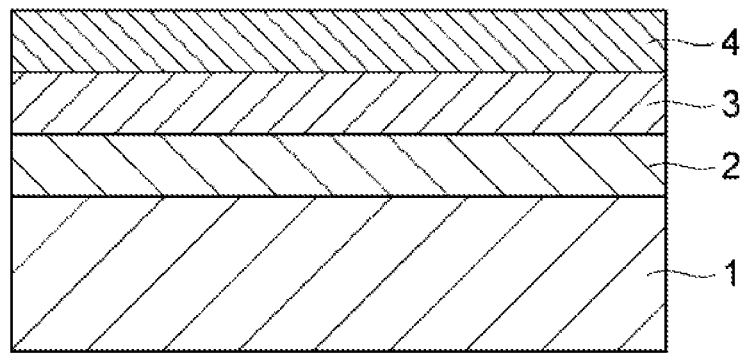
FIG. 2 is a schematic cross-sectional view of a packaging material according to an embodiment.
Figure 3:
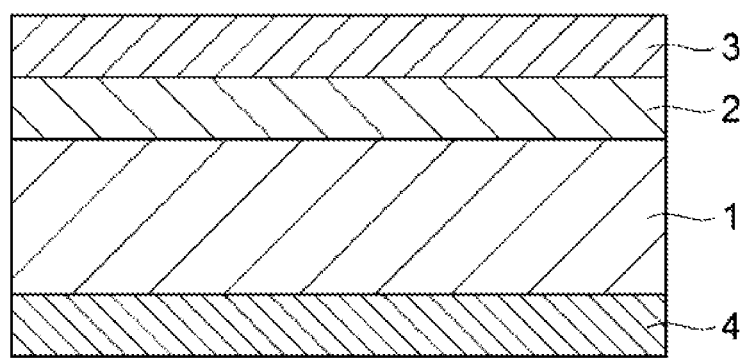
FIG. 3 is a schematic cross-sectional view of a packaging material according to an embodiment.

A packaging material includes the above-described gas barrier laminate and a sealant layer. The sealant layer includes a layer containing a polyolefin resin or a polyester resin. The thickness of the sealant layer may be appropriately determined depending on the purpose, and may be, for example, 15 to 200 μm. An adhesive layer may be added between the overcoat layer and the sealant layer, or between the substrate layer and the sealant layer, if necessary, to provide better adhesion between the layers. The adhesive layer can be formed using one- or two-part curable urethane-based adhesives. FIGS. 2 and 3 are schematic cross-sectional views of the packaging material according to an embodiment.

The packaging material 100 shown in FIG. 2 includes the gas barrier laminate and a sealant layer 4 disposed on an overcoat layer 3 of the gas barrier laminate. The gas barrier laminate includes a substrate layer 1, a barrier layer 2, and an overcoat layer 3, which are arranged in this order. For example, when both the substrate layer 1 and the sealant layer 4 are polyolefin resins, the content of the polyolefin resin can be 90 mass % or more (preferably 95 mass % or more) relative to the total mass of the packaging material 100. Such packaging material 100 can realize mono-materials.

In the above embodiment, the packaging material 100 in which the sealant layer 4 is attached to the surface of the overcoat layer 3 of the gas barrier laminate is exemplified. However, the packaging material 200 in which the sealant layer 4 is attached to the surface of the substrate layer 1 of the gas barrier laminate may be used (see FIG. 3).

EXAMPLES

The present disclosure is more particularly described by way of Experimental Examples, to which the present disclosure should not be construed as being limited.

(Preparation of Anchor Coat Layer-Forming Composition)

A mixed solution of xylylene diisocyanate and isophorone diisocyanate was prepared in a mixed solution of acrylic polyol and isocyanate silane. Acrylic polyol was mixed so that the number of NCO groups in the xylylene diisocyanate and isophorone diisocyanate were equal to the number of OH groups in the acrylic polyol, and the mixture was diluted with ethyl acetate so that the total solid content (total mass of acrylic polyol, xylylene diisocyanate, and isophorone diisocyanate) became 5 mass %. Isocyanate silane was further added in an amount of 5 parts by mass relative to a total of 100 parts by mass of mixed acrylic polyol, xylylene diisocyanate, and isophorone diisocyanate, which were then mixed to prepare an anchor coat layer-forming composition (anchor coat material).

(Preparation of Overcoat Layer-Forming Composition L1)

An overcoat layer-forming composition (overcoat material) was prepared by mixing the following solutions A, B, and C at a mass ratio of 65/25/10.

Solution A: Hydrolyzed solution with a solid content of 5 mass % (in terms of $SiO_2$ equivalent) obtained by adding 72.1 g of 0.1 N hydrochloric acid to 17.9 g of tetraethoxysilane ($Si(OC_2H_5)_4$) and 10 g of methanol and stirring for 30 minutes for hydrolysis.

Solution B: A water/isopropyl alcohol solution (water and isopropyl alcohol in the mass ratio 95:5) containing 5 mass % polyvinyl alcohol.

Solution C: Hydrolyzed solution prepared by diluting 1,3,5-tris (3-trialkoxysilylpropyl) isocyanurate with a mixture of water and isopropyl alcohol (mass ratio of water:isopropyl alcohol is 1:1) to produce a solid content of 5 mass %.

(Preparation of Overcoat Layer-Forming Composition L2)

The following B and D solutions were mixed so that the content of water-swelling synthetic mica in the overcoat layer became 30 mass %. This was diluted with water and methanol (mass ratio is 1:1) to prepare an overcoat layer-forming composition.

Solution B: A water/isopropyl alcohol solution (water and isopropyl alcohol in the mass ratio 95:5) containing 5 mass % polyvinyl alcohol Solution D: As water-swelling mica, water-swelling synthetic mica (Somasif MEB-3, manufactured by Katakura & Co-op Agri Corporation) was used. Water-swelling synthetic mica was treated using a bead mill so that the area particle size was 2 Water was then added to obtain a final solids concentration of 8 mass %.

(Preparation of Overcoat Layer-Forming Composition L3)

An overcoat layer-forming composition was prepared by mixing polyurethane resin, 5% PVA aqueous solution, and epoxysilane so that their respective solid content ratios became 60:35:5, and the mixture was diluted with water and isopropanol so that the solids concentration of the solution became 5%. At this time, isopropanol was 10 mass % of the total overcoat layer-forming composition.

(Preparation of Substrate Layer)

OPP film: Polypropylene homopolymer layer (thickness: 20 μm)

PE film (with corona treatment): SMUQ (manufactured by Tokyo Printing Ink Mfg. Co., Ltd., thickness: 25 stretched HDPE)

Example 1

Using maleic anhydride modified polypropylene resin as an adhesive layer, an EVOH layer as an anchor coat layer was formed on the OPP film by co-extrusion. The adhesive layer had a thickness of 1 and the EVOH layer had a thickness of 1 μm.

A transparent inorganic oxide layer (barrier layer) made of silicon oxide (SiOx) with a thickness of 30 nm was formed on the anchor coat layer by using a vacuum deposition device with an electron beam heating method. The O/Si ratio in the inorganic oxide layer was 1.8.

The overcoat layer-forming composition L1 was coated on the inorganic oxide layer by the gravure roll coating method, and the coated film was heated and dried at 80° C. for 1 minute to form a 0.3 μm thick overcoat layer. Thus, a barrier film was obtained.

Example 2

The above anchor coat layer-forming composition was coated on the corona-treated surface of the PE film by the gravure roll coating method, and the coated film was dried and cured at 60° C. to form an anchor coat layer having a coating amount of 0.1 g/m2 per unit area.

Next, an inorganic oxide layer was formed on the anchor coat layer in the same manner as in Example 1.

The overcoat layer was formed on the inorganic oxide layer in the same manner as in Example 1 except that the overcoat layer-forming composition L2 was used. Thus, a barrier film was obtained.

Other Examples and Comparative Examples

A barrier film was obtained in the same manner as in Examples 2, except that the substrate layer, barrier layer, overcoat material, and at least one of layer thickness and processing temperature were changed as shown in Table 1. In Example 6, a transparent inorganic oxide layer (barrier layer) made of aluminum oxide (AlOx) with a thickness of 10 nm was formed on the anchor coat layer by using a vacuum deposition device with an electron beam heating method.

(Lamination and Removal of Sealant Layer)

For the barrier films obtained in Example 7 and Comparative Example 3, a sealant layer was attached to the surface on the overcoat layer side using an adhesive (Takelak A 525/Takenate A 52 manufactured by Mitsui Chemicals, Inc.) to obtain the packaging material shown in FIG. 2. Then, the overcoat layer was exposed again by the following procedure. The barrier films thus obtained were subjected to surface hardness and composite elastic modulus measurements described later.

[Procedure]

The packaging material was cut into a size of 2 cm in length and width, and the entire cut packaging material was immersed in ethyl acetate solvent. One hour after the start of immersion, the packaging material was removed and the sealant layer was removed from the edge of the packaging material. Next, the entire barrier film with the sealant layer removed was again immersed in ethyl acetate solvent. After 30 minutes from the start of immersion, the barrier film was taken out, and the removed surface of the barrier film was subjected to ion etching treatment for three times for 10 minutes under HARD treatment conditions using the Plasma Ion Bombarder PIB-10 (manufactured by Vacuum Device Inc.). Before the ion etching treatment, the electrode of the Plasma Ion Bombarder was cleaned with Pikal Liquid (manufactured by NIHON MARYO KOGYO CO., LTD.). Thus, the barrier film with the overcoat layer exposed again was obtained.

The confirmation of whether the overcoat layer was exposed was performed by atomic force microscopy (AFM). Specifically, the surface profiles of the overcoat layer without a sealant layer and the overcoat layer removed as described above after the sealant layer is disposed were measured by AFM, and then the surface roughnesses were compared to see if the overcoat layer was exposed.

(Measurement of Surface Hardness and Composite Elastic Modulus)

Using an instant adhesive (Aron Alpha, manufactured by TOAGOSEI CO., LTD.), the barrier films obtained in each example were fixed to a magnet disk sample fixing jig, and then fixed to the stage of the device. A Hysitron TI-Premier (trade name) manufactured by Bruker Japan K.K. is used as the measuring device, and a Berkovich-type diamond indenter manufactured by Bruker Japan K.K. is used as the measuring indenter.

After selecting a flat portion of the surface of the overcoat layer of each film, the surface hardness and composite elastic modulus of the surface of the overcoat layer were measured by the nanoindentation method. Measurement by the nanoindentation method was performed at room temperature (25° C.) by indenting to a depth of 30 nm under the conditions of displacement control mode and indentation speed of 30 nm/sec, holding at the maximum depth for 1 second, and unloading under the conditions of unloading speed of 30 nm/sec. The number of measurement points was 30 (5 locations×3 points×2 sets), and the measurement interval was 50 μm.

To calculate the surface hardness and composite elastic modulus of the surface of the overcoat layer, fused quartz as a standard sample was tested in advance, and the relationship between the contact depth and the contact projected area of the indenter and the sample was calibrated. Next, the unloading curve in the 60 to 95% region relative to the maximum load during unloading was analyzed by the Oliver-Pharr method, and the surface hardness and composite elastic modulus of the surface of the overcoat layer were calculated. The results are shown in Table 1.

(Processability)

The film was evaluated for bending and blocking according to the following criteria. The results are shown in Table 2. In any of the evaluations, those with no evaluation of D were determined to have good processability.

—Evaluation of Bending—

The transport condition and winding condition of the film were examined when the overcoat layer was formed by the gravure roll coating method.

Evaluation A: Winding is possible without problems in transportation

Evaluation B: Winding is possible with the edge slightly lifted during transportation Evaluation C: Winding is possible although the edge curls during transportation Evaluation D: Bent in a cylindrical shape from the edge during transportation, poor winding —Evaluation of Blocking—

The ease of film removal (delamination) was examined when the film was rewound from the roll and transported.

Evaluation A: Removable without any problem

Evaluation B: Films are slightly adhered to each other but can be removed

Evaluation C: Films are adhered to each other but can be removed

Evaluation D: Films adhered to each other and cannot be removed

TABLE 1

| | Substrate layer | Anchor coat layer | Barrier layer | Overcoat material | Overcoat layer | Layer thickness/processing temperature | Surface hardness (GPa) | Composite elastic modulus (GPa) |
|---|---|---|---|---|---|---|---|---|
| Ex. 1 | OPP | EVOH | SiOx | L1 | TEOS/PVA/silane coupling agent | 0.3 μm/80° C. 1 minutes | 1.30 | 8.92 |
| Ex. 2 | PE | Acrylic polyol/isocyanate | SiOx | L2 | PVA/layered compound | 0.5 μm/70° C. 1 minutes | 0.29 | 4.58 |
| Ex. 3 | OPP | Acrylic polyol/isocyanate | SiOx | L2 | PVA/layered compound | 0.5 μm/70° C. 1 minutes | 0.27 | 3.76 |
| Ex. 4 | OPP | Acrylic polyol/isocyanate | SiOx | L1 | TEOS/PVA/silane coupling agent | 0.3 μm/60° C. 1 minutes | 0.96 | 6.93 |
| Ex. 5 | OPP | Acrylic polyol/isocyanate | SiOx | L3 | Urethane/PVA/silane coupling agent | 0.4 μm/60° C. 1 minutes | 0.34 | 5.41 |
| Ex. 6 | OPP | Acrylic polyol/isocyanate | AlOx | L1 | TEOS/PVA/silane coupling agent | 0.3 μm/80° C. 1 minutes | 1.20 | 8.62 |
| Ex. 7 | OPP | Acrylic polyol/isocyanate | SiOx | L1 | TEOS/PVA/silane coupling agent | 0.3 μm/60° C. 1 minutes | .98 | 6.76 |
| Comparative Ex. 1 | OPP | Acrylic polyol/isocyanate | SiOx | L1 | TEOS/PVA/silane coupling agent | 0.3 μm/120° C. 1 minutes | 1.60 | 11.05 |
| Comparative Ex. 2 | PE | Acrylic polyol/isocyanate | SiOx | L1 | TEOS/PVA/silane coupling agent | 0.3 μm/120° C. 1 minutes | 1.60 | 11.10 |
| Comparative Ex. 3 | OPP | Acrylic polyol/isocyanate | SiOx | L1 | TEOS/PVA/silane coupling agent | 0.3 μm/120° C. 1 minutes | 1.59 | 10.90 |

TABLE 2

| | Processability | |
|---|---|---|
| | Bending | Blocking |
| Example 1 | C | B |
| Example 2 | A | A |
| Example 3 | A | A |
| Example 4 | B | B |
| Example 5 | A | C |
| Example 6 | C | B |
| Example 7 | B | B |
| Comparative Example 1 | D | A |
| Comparative Example 2 | D | A |
| Comparative Example 3 | D | A |

[Reference Signs List] 1 . . . Substrate layer; 2 . . . Barrier layer; 3 . . . Overcoat layer; 4 . . . Sealant layer; 10 . . . Gas barrier laminate; 100, 200 . . . Packaging material.

What is claimed is:

1. A gas barrier laminate, comprising:
    a substrate layer comprising a polyolefin resin;
    a barrier layer comprising metal, metal oxide, metal nitride, or metal oxynitride; and
    an overcoat layer comprising (a) a polyvinyl alcohol resin and (b) at least one of a silane compound or an inorganic layered compound, the overcoat layer having a surface which has a surface hardness of 1.3 GPa or less, as measured by a nanoindentation method, and wherein a composite elastic modulus of the surface of the overcoat layer is 7.5 GPa or less when measured by the nanoindentation method.

2. The gas barrier laminate of claim 1, wherein the overcoat layer comprises the silane compound.

3. The gas barrier laminate of claim 1, wherein the overcoat layer comprises the inorganic layered compound.

4. A packaging material, comprising:
    the gas barrier laminate of claim 1; and
    a sealant layer.

5. The gas barrier laminate of claim 1, wherein the surface hardness is 1.1 GPa or less.

6. The gas barrier laminate of claim 1, wherein the surface hardness is 0.9 GPa or less.

7. The gas barrier laminate of claim 1, wherein a composite elastic modulus of the surface of the overcoat layer is 6 GPa or less when measured by the nanoindentation method.

8. The gas barrier laminate of claim 1, wherein the barrier layer consists of silicon oxide or aluminum oxide.

* * * * *